United States Patent
Kendall

(10) Patent No.: US 11,922,296 B2
(45) Date of Patent: Mar. 5, 2024

(54) ELECTRICAL NETWORKS USING ANALYTIC LOSS GRADIENTS FOR DESIGN, ANALYSIS AND MACHINE LEARNING

(71) Applicant: Rain Neuromorphics Inc., San Francisco, CA (US)

(72) Inventor: Jack David Kendall, Millbrae, CA (US)

(73) Assignee: Rain Neuromorphics Inc., San Francisco, CA (US)

( * ) Notice: Subject to any disclaimer, the term of this patent is extended or adjusted under 35 U.S.C. 154(b) by 0 days.

(21) Appl. No.: 17/875,223

(22) Filed: Jul. 27, 2022

(65) Prior Publication Data

US 2023/0040533 A1  Feb. 9, 2023

Related U.S. Application Data

(60) Provisional application No. 63/243,998, filed on Sep. 14, 2021, provisional application No. 63/226,637, filed on Jul. 28, 2021.

(51) Int. Cl.
*G06N 3/063* (2023.01)

(52) U.S. Cl.
CPC .................... *G06N 3/063* (2013.01)

(58) Field of Classification Search
CPC ...................................................... G06N 3/063
See application file for complete search history.

(56) References Cited

U.S. PATENT DOCUMENTS

| 5,101,361 | A | 3/1992 | Eberhardt | |
|---|---|---|---|---|
| 5,247,606 | A | 9/1993 | Tam | |
| 5,319,737 | A * | 6/1994 | Reibling | G06F 30/18 706/30 |
| 8,275,727 | B2 | 9/2012 | Elmegreen | |
| 11,334,788 | B2 * | 5/2022 | Das | G06N 3/063 |
| 2014/0114636 | A1 * | 4/2014 | Daloukas | G06F 30/367 703/14 |
| 2016/0379110 | A1 * | 12/2016 | Eleftheriou | G06N 3/049 706/33 |
| 2019/0005402 | A1 * | 1/2019 | Mohseni | G06N 20/00 |
| 2020/0104678 | A1 * | 4/2020 | Nixon | G06N 3/042 |
| 2020/0372353 | A1 * | 11/2020 | Qin | G06N 3/08 |
| 2021/0125070 | A1 * | 4/2021 | Wang | G06N 3/063 |

OTHER PUBLICATIONS

Fei, Wei, et al. "Design exploration of hybrid cmos and memristor circuit by new modified nodal analysis." IEEE Transactions on very large scale integration (VLSI) systems 20.6 (2011): 1012-1025. (Year: 2011).*

Rasoulzadeh Darabad, Mansour. A fine-grained approach to parallelise the circuit simulation process on highly parallel systems. Diss. University of Southampton, 2015: i-145 (Year: 2015).*

(Continued)

*Primary Examiner* — Kamran Afshar
*Assistant Examiner* — Randall K. Baldwin
(74) *Attorney, Agent, or Firm* — Van Pelt, Yi & James LLP

(57) ABSTRACT

A system includes inputs, outputs, and nodes between the inputs and the outputs. The nodes include hidden nodes. Connections between the nodes are determined based on a gradient computable using symmetric solution submatrices.

18 Claims, 5 Drawing Sheets

(56) References Cited

OTHER PUBLICATIONS

Suarez, Laura E., Jack D. Kendall, and Juan C. Nino. "Evaluation of the computational capabilities of a memristive random network (MN3) under the context of reservoir computing." Neural Networks 106 (2018): 223-236. (Year: 2018).*

Garyfallou, Dimitrios, Nestor Evmorfopoulos, and Georgios Stamoulis. "Large scale circuit simulation exploiting combinatorial multigrid on massively parallel architectures." 2018 7th International Conference on Modern Circuits and Systems Technologies (MOCAST). IEEE, 2018. (Year: 2018).*

Chen, Zaichen. Modeling of electrical circuit with recurrent neural networks. Diss. University of Illinois at Urbana-Champaign, 2019: i-.97 (Year: 2019).*

Kendall, Jack, et al. "Training end-to-end analog neural networks with equilibrium propagation." arXiv preprint arXiv:2006.01981 (Jun. 9, 2020). (Year: 2020).*

Wang, Nana. "The Analysis of Electronic Circuit Fault Diagnosis Based on Neural Network Data Fusion Algorithm." Symmetry 12.3 (2020): 458. (Year: 2020).*

Kendall, Jack D., Ross D. Pantone, and Juan C. Nino. "Deep learning in memristive nanowire networks." arXiv preprint arXiv: 2003.02642 (2020):1-9 (Year: 2020).*

Lee, Hyeungill, Sungyeob Han, and Jungwoo Lee. "Generative adversarial trainer: Defense to adversarial perturbations with gan." arXiv preprint arXiv:1705.03387 (2017) (Year: 2017).*

Hirano, Hokuto, and Kazuhiro Takemoto. "Simple iterative method for generating targeted universal adversarial perturbations." Algorithms 13.11 (2020): 268. (Year: 2020).*

Jeddi, Ahmadreza, et al. "Learn2perturb: an end-to-end feature perturbation learning to improve adversarial robustness." Proceedings of the IEEE/CVF Conference on Computer Vision and Pattern Recognition. 2020. (Year: 2020).*

Scellier et al., Equilibrium Propagation: Bridging the Gap between Energy-Based Models and Backpropagation, published May 4, 2017, vol. 11, Article 24.

Ismet Bayraktaroglu, Circuit Level Simulation Based Training Algorithms for Analog Neural Networks, Electrical and Electronic Engineering, M.S. Thesis, 1996.

Li et al., In Situ Parallel Training of Analog Neural Network Using Electrochemical Random-Access Memory, Frontiers In Neuroscience, Apr. 2021, vol. 15, Article 636127, pp. 1-14.

* cited by examiner

ELECTRICAL NETWORKS USING ANALYTIC LOSS GRADIENTS FOR DESIGN, ANALYSIS AND MACHINE LEARNING

CROSS REFERENCE TO OTHER APPLICATIONS

This application claims priority to U.S. Provisional Patent Application No. 63/226,637 entitled LOCAL ANALYTIC LOSS GRADIENT FOR ELECTRICAL CIRCUITS filed Jul. 28, 2021 and U.S. Provisional Patent Application No. 63/243,998 entitled METHOD AND SYSTEM FOR PROVIDING AND ANALYZING ELECTRICAL NETWORKS UTILIZING ANALYTIC LOSS GRADIENTS filed Sep. 14, 2021, both of which are incorporated herein by reference for all purposes.

BACKGROUND OF THE INVENTION

In order to perform machine learning in hardware networks, such as analog neural networks, layers of hardware neurons may be utilized. The input signals (e.g. an input vector) to a layer are multiplied by weights using the hardware synapses for the layer. These weights are frequently implemented as resistances. Hardware neurons in the layer combine the weighted inputs using some function and provide outputs. The output signals are provided as input signals to the next layer. This process may be repeated for the layers of the network.

Machine learning involves evaluating the final output signals of the last layer based on a set of target values (e.g. the desired output signals) for a given set of input signals. To improve the correlation between the output signals and the target values, the weights for the hardware synapses in one or more of the layers are adjusted. This process includes adjusting the weights at synapses within the network (e.g. hidden nodes that are not output or input nodes). To adjust the weights, a loss function is generally used. The loss function may be defined as a quantification of the network's performance for a particular task, or error from a desired set of outputs. For example, the loss function may be the difference between the outputs of the hardware neural network and the target values. The gradient of the loss function with respect to the weights (e.g. the impedances or conductances at the synapses) indicates how each weight should be adjusted in order to achieve the desired result. In practice, however, the gradient is difficult to calculate. Determining how to adjust the weights to achieve the target based on the output is, therefore, challenging.

Various techniques exist in order to aid in determining the desired weights. Backpropagation explicitly calculates the gradient for all layers of the network. In practice, however, the gradient is difficult or impossible to explicitly determine without an exact model of the entire learning network. Thus, the use of backpropagation may be limited. Equilibrium propagation approximates the gradients using finite differences. However, equilibrium propagation and other models have limitations. Accordingly, what is desired is an improved technique for determining gradients for hardware learning networks.

BRIEF DESCRIPTION OF THE DRAWINGS

Various embodiments of the invention are disclosed in the following detailed description and the accompanying drawings.

DETAILED DESCRIPTION

Figure 1:
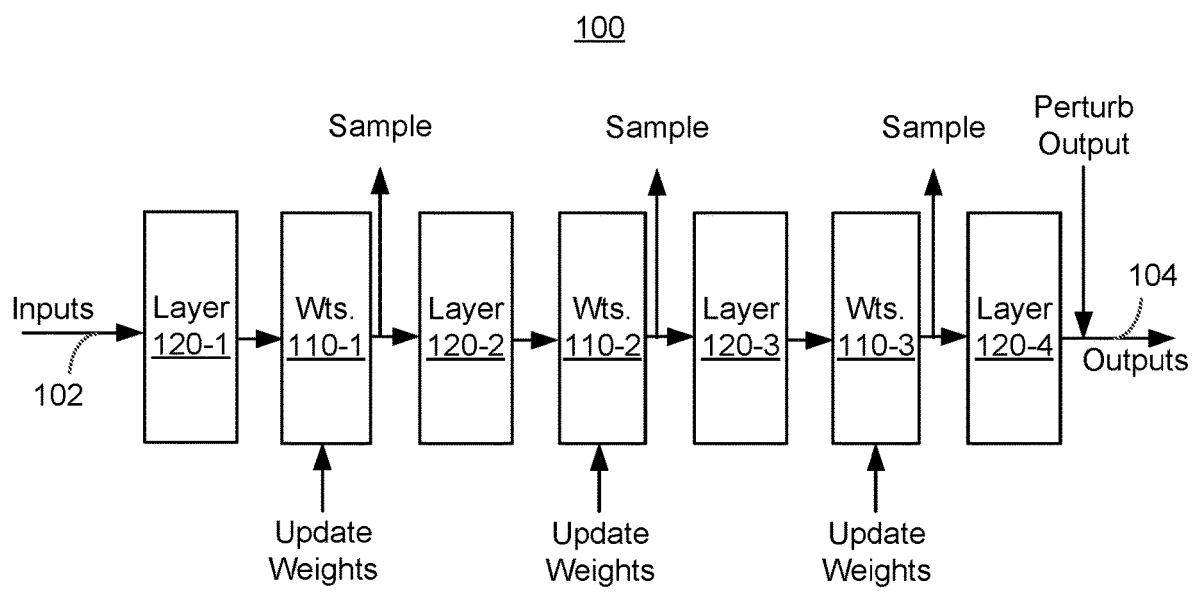
FIG. 1 depicts an embodiment of a learning network having symmetric solution submatrices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system includes inputs, outputs, and nodes between the inputs and the outputs. The nodes include hidden nodes. Connections between the nodes are determined based on a gradient that is computable using symmetric solution submatrices. In some embodiments, the symmetric solution submatrices are part of a modified nodal analysis (MNA) solution matrix. The gradient may be analytically determined using the symmetric solution submatrices.

One or more of the symmetric solution submatrices may correspond to network components including negative resistance component(s) and/or combination(s) of component(s) and dual(s) of the component(s). One or more of the symmetric solution submatrices may correspond to a network component having at least three terminals. In some embodiments, the system also includes electrical components corresponding to one or more asymmetric solution submatrices. In some embodiments, weights correspond to the connections and are programmed based on the gradient. The weights may be programmed by perturbing a plurality of states of the plurality of outputs, measuring resulting perturbations across connections, and programming the plurality of weights based on the resulting perturbations.

A network including inputs, outputs, and nodes between the inputs and outputs is described. The nodes include hidden nodes. A portion of the network has an analytic solution computable by MNA using an MNA solution matrix. One or more submatrices of the MNA solution matrix are one or more symmetric solution submatrices. Connections between the hidden nodes are determined based on a gradient of a loss function for the network calculatable using the symmetric solution submatrix/submatrices. In some embodiments, the network also includes weights for the hidden nodes. The weights are programmable based on the gradient of the loss function. In some embodiments, the symmetric solution submatrices correspond to network components, including negative resistance component(s), and/or combination(s) of component(s) and dual(s) of the component.

In some embodiments, an additional portion of the network includes a plurality of electrical components that correspond to at least one asymmetric solution submatrix. A symmetric solution submatrix of the symmetric solution submatrices may correspond to a network component having at least three terminals.

A method is described. The method includes determining a solution matrix for a network using MNA. The network includes inputs, outputs, and nodes including hidden nodes. One or more symmetric solution submatrices of the solution matrix correspond to at least a portion of the network. The method also includes determining a gradient of a loss function for the portion of the network using the symmetric solution submatrices. Connections for the portion of the network are determined based on the gradient. In some embodiments, determining connections includes programming weights for the connections. Programming the weights may include perturbing one or more states of the outputs, measuring resulting perturbation(s) for the connections, and programming the weights based on the resulting perturbation(s) and the gradient. Determining the connections may include providing a physical instantiation of the network based on the gradient. The portion of the physical instantiation of the network corresponding to the symmetric submatrix or submatrices may include network components including negative resistance component(s) and/or combination(s) of component(s) and dual(s) of the component(s). In some embodiments, the portion of the physical instantiation of the network corresponding to the symmetric submatrix or submatrices includes device(s) having at least three terminals.

Using analytically determined gradients may not only facilitate training of existing hardware neural networks (e.g. determining the conductances/impedances for hardware synapses) but also assist in design of such hardware neural networks. Further, the ability to analytically determine the gradients for such circuits may be extended to other networks and other aspects of the design and use of electrical circuits. Although described in the context of hardware neural networks, the techniques described herein are applicable to other fields in electrical circuits.

Modified nodal analysis (MNA) is a technique that predicts behavior (e.g. the operating point) of a network (e.g. a circuit) by representing nodes in an electrical circuit using voltages, conductances, and currents. MNA also utilizes a linearized circuit. For example, a nonlinear component such as a diode at particular operating conditions may be represented by a linear resistor that has the resistance of the diode connected in parallel with a current source at the particular operating conditions. In its matrix formulation, MNA may be considered to be: z=Ax, where z is the voltage sources (e) and sum of the currents (i) in each node (z=[i, e]); A is the MNA solution matrix that may be considered to represent the conductances of passive two-terminal components, voltage sources, and current sources for each node; and x represents the unknown node voltage, v, and currents, j, through the voltage sources (x=[v,j]). Thus, the MNA solution matrix is an m×m matrix, where m is the number of unknowns, n is the number of unknown node voltages, and m−n (i.e., the difference between m and n) is the number of unknown branch currents.

Using MNA, the operating point of the circuit may be recursively determined. For example, the equation z=Ax may be iteratively solved using Newton's method until the final operating point of the circuit is reached. Moreover, at each iteration, the state of the linearized circuit is independent. Consequently, the solution to the linearized circuit (i.e. the operating point determined via MNA) is not dependent upon the path taken to find the operating point. The solution to the linearized circuit may also be seen as the first order Taylor expansion of the nonlinearized circuit at the operating point. Thus, the linearized circuit has the same operating point and nearby (e.g. first order) behavior as the nonlinear circuit.

In order to understand how to adjust weights, or conductances, within a circuit (e.g. conductances of synapses in a neural network), the loss function for the circuit is determined and the gradient of the loss function with respect to the conductances is calculated. As indicated above, the operating point of the circuit is found using z=Ax. However, this can also be expressed as $x=A^{-1}z$, where $A^{-1}$ is the inverse of the MNA solution matrix. The loss function (the measure of the performance/operating point of the circuit with respect to a target behavior) is also a function of the inverse of the MNA solution matrix. The gradient used in determining how to adjust the conductances of circuit includes the derivative of the inverse of the MNA solution matrix with respect to the conductances. The gradient of the loss function can be given by:

$$\frac{\partial \mathcal{L}}{\partial g_{ij}} = (x_i^0 - x_j^0)\left((A^{-1}\delta_{out})_i - (A^{-1}\delta_{out})_j\right) \quad (1)$$

Where $\mathcal{L}$ is the loss function, g is conductance, x is the voltage at a node, $\delta_{out}$ is a perturbation of the output, $A^{-1}$ is the inverse of an MNA solution matrix, and i and j are node indices.

Because the gradient also describes first order behavior of the circuit, the gradient of the nonlinear circuit at the operating point is the same as the gradient of the linearized circuit for MNA. Thus, determining the gradient of the linearized, MNA circuit at the operating point also expressly determines the gradient of the nonlinear circuit at the operating point. Consequently, the gradient of the loss function for a nonlinear (or linear) circuit can be analytically determined using the inverse of the MNA matrix. Further, it is noted that the gradient of the loss function is determined without reference to an energy function. This is in contrast to techniques, such as equilibrium propagation, which rely on such an energy function in order to estimate gradients.

For some circuits, the inverse of the MNA solution matrix (as well as the MNA solution matrix) is symmetric. These circuits may be all or part of a circuit, or network, of interest. Thus, a particular network or system may include one or more symmetric solution submatrices. It has been determined that for such circuits, a current, I, injected at a node (e.g. a hidden node) results in an output voltage, V, then the same current, I, injected at the output results in the same voltage, V, at the node. Such circuits are known as reciprocal circuits. In such networks, perturbing the output results in a perturbation at nodes in the network, including hidden nodes. These nodes are considered to be symmetric. Thus, perturbing the outputs can be used to experimentally (or via simulation) determine the gradients for circuits consisting of symmetric nodes (MNA matrix and inverse of MNA matrix fully symmetric). However, the class of circuits for which the MNA solution matrix and its inverse are symmetric may be limited.

It has been determined that for some circuits, submatrices of the MNA solution matrix (e.g., representing only a part of the entire circuit or network) may be symmetric. For example, for some networks, some hidden nodes (e.g. nodes that are within the circuit and are not output or input nodes) and output nodes are reciprocal, while other hidden nodes and the output nodes are non-reciprocal. For the portion of the circuit in which the nodes are reciprocal, the corresponding submatrix of the MNA matrix is symmetric. As used herein, a network (or portion of a network) termed symmetric is a network (or portion of the network) for which nodes are reciprocal and/or for which the MNA matrix (or submatrix) is symmetric. For certain desired networks that may not be fully symmetric, an analytical process may be used to design equivalent symmetric networks. For equivalent symmetric networks, processes such as the perturbative techniques described herein can determine the gradients. This may allow for more accurate programming. Further, equivalent symmetric networks may also provide quick and easy programming of the network to solve different and/or rapidly changing problems. For example, analytically determined gradients may be used to design networks that are at least partially symmetric based on the expected inputs, expected target values, and gradients. Existing networks that are at least partly symmetric may be more readily programmed by perturbing the outputs and determining the resulting changes to hidden and/or input nodes. Further, because the gradients can be analytically determined, approximations of gradients (e.g. equilibrium propagation) may be compared to the true gradients. In addition, higher order (e.g. second order) calculations for networks may be accomplished using analogous principals. Such higher order techniques used in evaluating and programming networks may improve the efficiency of machine learning and other applications. Thus, design, learning, and use of networks may be improved.

FIG. 1 depicts an embodiment of learning network 100 having symmetric solution submatrices. Learning network 100 may be an analog system for performing machine learning. Learning network 100 includes multiple layers 120-1, 120-2, 120-3, and 120-4 (collectively or generically layer(s) 120) of neurons that are interleaved with weights 110-1, 110-2, and 110-3 (collectively or generically weights 110). Learning network 100 also includes inputs 102 and outputs 104. Inputs 102, outputs 104, and the connections between weights 110 and layers 120 are shown as single arrows. In general, however, multiple inputs, multiple outputs, and multiple connections are present. Although four layers 120 of neurons and three sets of weights 110 are shown, another number of layer(s) of neurons and/or another number of layer(s) of weights may be used.

Layers 120 each includes components corresponding to neurons, or nodes (e.g. the nodes that are in the inference path between inputs 102 and outputs 104 and to which neurons are connected). Many of the nodes in layers 120 are hidden nodes, which are not directly connected to inputs 102 or outputs 104. The components (e.g. neurons) of layer 120 receive weighted inputs from weights 110 and combine the weighted inputs based on a function of the weighted inputs to provide one or more outputs. Layers 120-1, 120-2 and 120-3 provide their outputs to another layer of weights 110. Layer 120-4 provides the outputs for learning system 100. In some embodiments, layers 120 are the same. In other embodiments, layer(s) 120 may differ from other layer(s) 120. The individual components of layers 120 (e.g. components of neurons) may be symmetric (e.g. resistors and/or memristors) and/or asymmetric (e.g. amplifiers and/or transistors). However, in some embodiments, such components are coupled such that the nodes for sets of components are symmetric with respect to outputs 104. Thus, sets of such components are coupled such that some or all of the nodes in layers 120 that are in the inference path are symmetric with respect to outputs 104. Stated differently, the solution submatrices (e.g. submatrices of the MNA solution matrix) for such nodes and/or such sets of components are symmetric.

Weights 110 each includes programmable components, such as a memristors and/or other programmable resistors, for which the impedance (or resistance) can be adjusted. Weights 110 may be considered to be analogous to synapses in a biological neural network. In some embodiments, the programmable components of weights 110 are fully connected (each weight or programmable components is connected to all of its neighbors). In other embodiments, the programmable components of weights 110 are sparsely connected (not all weights or programmable components connected to all of its neighbors). In some embodiments, the connections between programmable components of weights 110 are programmable. For example, switches may be between some or all of the programmable components. Each set of weights 110 may be the same or different from other sets of weights 110. In some embodiments, a separate component is used to update the programmable components (i.e. weights) in weights 110. In some embodiments, weights 110 includes logic used to update the programmable components. Because weights 110 include components such as memristors, the nodes for components of weights 110 in the inference path (e.g. between input 102 and output 104) are generally symmetric with respect to outputs 104. Stated differently, the solution submatrices of the MNA matrix for weights 110 may be symmetric.

Learning network 100 may be considered a physical instantiation of a network having symmetric solution submatrices and, in some embodiments, a symmetric MNA solution matrix. Some portions of learning network 100 may be asymmetric (i.e. described by asymmetric solution submatrices). However, the connections between at least some of the components of layers 120 and weights 110 are described by symmetric solution submatrices. More specifically, the connections for nodes (including hidden nodes) to which neurons are coupled are determined based on the symmetric solution submatrices. Thus, the connections between nodes of layers 120 are configured such that these portions of learning network 100 are described by symmetric solution submatrices. For example, in layers 120, the nodes to which neurons are connected may be described by symmetric solution submatrices. As discussed herein, symmetric solution submatrices mean that the gradient of the loss function for the portions of network 100 described by the symmetric solution submatrices may be analytically determined. Connections between the nodes may, therefore, be determined based on a gradient that is computable using symmetric solution submatrices and/or may be analytically determined by perturbing outputs 104 and measuring the resultant perturbation at the nodes.

The presence of symmetric solution submatrices corresponds to a gradient of the loss function that may be expressly determined. The gradient of the loss function being explicitly calculable translates to equilibrium propagation being capable of analytically determining the gradient of the loss function. For example, weights 110 corresponding to the connections and nodes are programmed based on the gradient. The programmable components in weights 110 (e.g. memristors) are symmetric. The symmetric solution submatrices for nodes in layers 120, as well as for weights 110, allow weights 110 to be programmed via equilibrium propagation. For example, input signals having particular target values may be provided to inputs 102. An inference is performed by learning network 100, resulting in output signals on outputs 104, as well as particular voltages and other values within network 100. The outputs are perturbed, for example in the direction of the target values. The resultants of the perturbation are sampled within learning network 100. The change in the resultants indicates how the gradient changes.

Learning network 100 having symmetric solution submatrices is provided and used. In some embodiments, learning network 100 is designed such that sets of components coupled to particular nodes, including hidden nodes, are described by symmetric solution submatrices. For example, neurons in layers 120 are symmetric. As a result, the connections for nodes may be determined based the symmetric solution submatrices and the corresponding gradients. Similarly, because weights 110 include programmable resistances, weights 110 are also symmetric. The gradient for some or all of learning network 100 may be analytically determined. Further, the symmetry of the solution submatrices translates to equilibrium propagation being usable for determining the gradient of the loss function. Stated differently, the gradient of the loss function for programmable components in weights 110 may be determined by providing input signals, allowing the outputs signals to be developed on outputs 104, sampling (i.e.) the status of components (e.g. hidden nodes) in learning network 100, perturbing outputs 104 in the direction of the target values (e.g. by clamping outputs 104 at particular values), and sampling the updated resulting status of the components in learning network 100 due to the perturbation. Programmable components in weights 110 may have their resistances adjusted based on this gradient.

Thus, using the techniques described herein, gradients may be analytically determined for learning network 100 which is at least partially symmetric. These gradients may be used to design learning network 100 that are at least partially symmetric, e.g. using simulations based on the expected inputs, expected target values, and gradients. Existing networks that are at least partly symmetric may more efficiently carry out machine learning. In particular, learning achieved by perturbing the outputs and measuring the resultants at hidden nodes of learning network 100 (i.e. equilibrium propagation) may be performed. Thus, weights 110 may be more rapidly adjusted to the desired values for the target values. Further, because the gradients can be analytically determined, approximations of gradients may be evaluated. Thus, performance of learning network 100 may be enhanced. Further, the techniques used in connection with network 100 may be used with other circuits configured and/or used for applications other than learning.

Portions of a network may be symmetric and, therefore, have symmetric solution submatrices. Such networks may achieve the benefits described herein. Such symmetry is not limited to electrical components that are intrinsically symmetric, such as resistors. Further, such symmetry is not limited to components having fewer than three terminals or components without gain. Instead, devices having gain, three or more terminals, and/or other asymmetries may be combined to provide a portion of a network that is symmetric. By connecting these combinations of devices at particular nodes to the remainder of the network, the symmetry of the network and benefits described herein, may be preserved. For example, FIGS. 2A and 2B combinations of components usable in networks having symmetric solution submatrices.

Figure 2A:
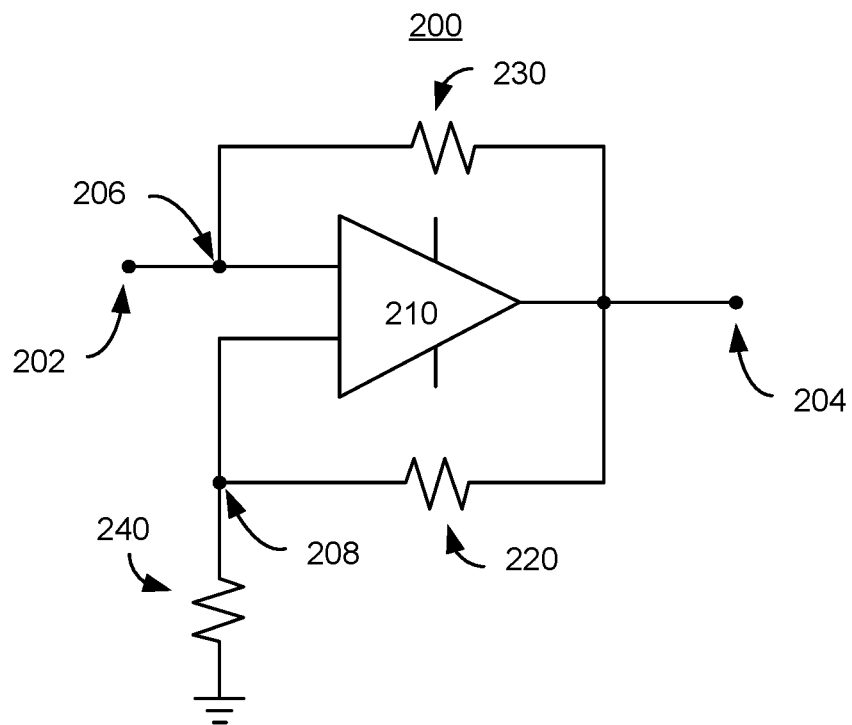
FIGS. 2A-2B depicts embodiments of a combinations of components having symmetric solution submatrices.

FIG. 2A depicts an example of a nonlinear component 200 usable in networks having a symmetric solution matrix. Nonlinear component 200 is a negative impedance converter (NIC). NIC 200 includes an operational amplifier (op-amp) 210 and resisters 220, 230, and 240 that may be set depending upon the desired output of NIC 200. Also shown are nodes 202 and 204. In the embodiment shown, nodes 202 and 204 are symmetric as defined herein. Op-amp 210 is not symmetric. Some other nodes (e.g. nodes 206 and 208) are not symmetric. Thus, a first perturbation at node 202 results in a second perturbation at node 204, and the second perturbation at node 204 results in the first perturbation at node 202. However, this is not true for nodes 202 and 206. Thus, NIC 200 viewed as a complete circuit is asymmetric. Because nodes 202 and 204 are symmetric, asymmetric NIC 200 may be coupled to another circuit (e.g. a network) via nodes 202 and 204 without destroying the symmetry of the circuit. For example, NIC 200 may connected in one or more layer 120 via nodes 202 and 204.

Figure 2B:
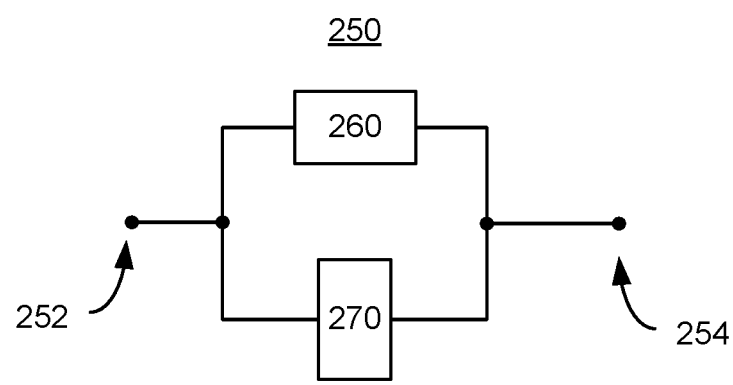

Similarly, FIG. 2B depicts an example of combination 250 nonlinear components 260 and 270 usable in networks having a symmetric solution submatrix. Components 260 and 270 individually are not symmetric. However, nonlinear component 270 is the dual of nonlinear component 260. For example, if component 250 is an amplifier having a gain of 5, then component 260 may be an amplifier having a gain of ⅕. Also shown are nodes 252 and 254 that are analogous to nodes 202 and 204. More specifically, nodes 252 and 254 are symmetric as defined herein. Thus, a first perturbation at node 252 results in a second perturbation at node 254, and the second perturbation at node 254 results in the first perturbation at node 252. Thus, combination 250 viewed as a complete circuit is symmetric. Because nodes 252 and 254 are symmetric, asymmetric combination 250 may be coupled to another circuit (e.g. a network) via nodes 202 and 204 without destroying the symmetry of the circuit.

Figure 3:
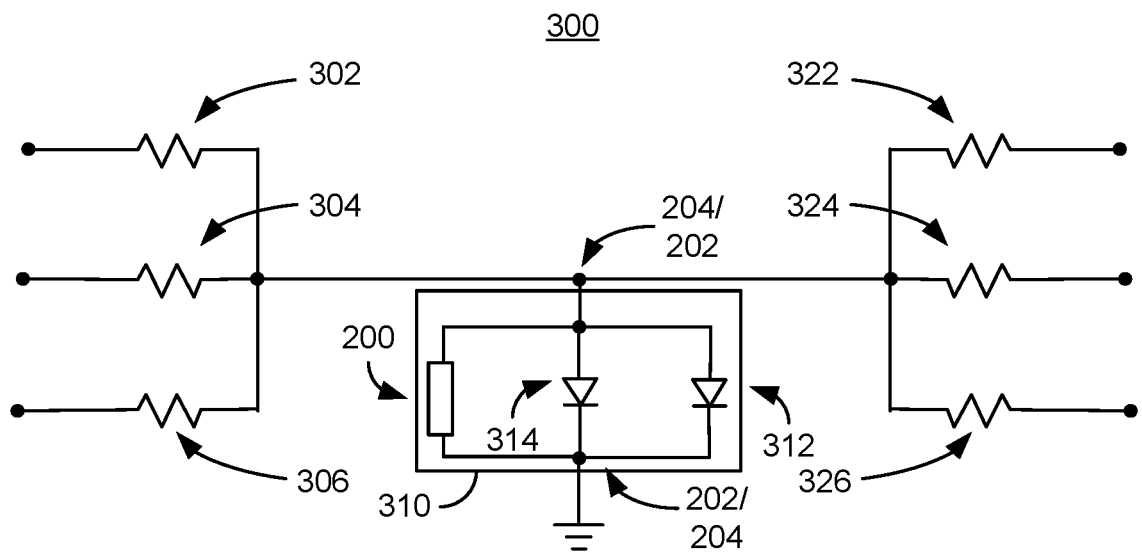
FIG. 3 depicts an embodiment of a network having symmetric solution submatrices.

FIG. 3 depicts a network 300 that is partially symmetric. Network 300 includes resistors 302, 304, and 306 that may be viewed as part of input synapses, hardware neuron 310, and resistors 322, 324 and 326 that may be viewed as part of output synapses (or input synapses to another layer of the network). In some embodiments, resistors 302, 304, 306, 322, 324 and/or 326 may be programmable resistors, such as memristors. Thus, network 300 may be part of a larger, programmable hardware neural network including numerous hardware neurons, synapses, and nodes. Hardware neuron 310 includes diodes 312 and 314 as well as NIC 200. NIC 200 is coupled such that nodes 202 and 204 are coupled to diodes in either configuration shown (i.e. either node 202 is coupled to ground or node 204 is coupled to ground). Resistors 302, 304, 306, 322, 324, and 326 are symmetric. Thus, network 300 may be part of a learning network such as network 100. For example, hardware neuron 310 may be part of a layer 120 (e.g. layer 120-3), while resistors 302, 304, 306, 322, 324, and/or 326 may be part of sets of weights 110 (e.g. weights 110-2 and 110-3).

Because NIC 200 is coupled to resistors 302, 304 306, 322, 324, and 326 via nodes 302 and 304, this portion of network 300 remains symmetric. As a result, the gradient for network 300 may be readily analytically determined and used in programming even though part of the network (e.g. part of NIC 200) is asymmetric. If network 300 was coupled to other, asymmetric components (not shown), network 300 is still symmetric as shown and has gradients that can be analytically determined and used in programming. Although other gradients for asymmetric portions of the network may be analytically determined, in practice such gradients are less useful for programming described herein. Further, the gradients for resistances 302, 304, 306, 322, 324, 326 and 328 may be experimentally determined by perturbing the outputs (e.g. all outputs of circuit 300 or a larger symmetric circuit) and measuring the resulting changes in nodes within circuit 300 (including hidden node 204/202). Resistances 302, 304, 306, 322, 324, and 326 may be programmed. The approximations of the gradients determined in this manner may be evaluated using the analytically determined gradients. Thus, the programming for hidden nodes 204/202 for network 300 and analogous networks may be facilitated. Consequently, machine learning using circuit 300 may be enhanced.

Figure 4:
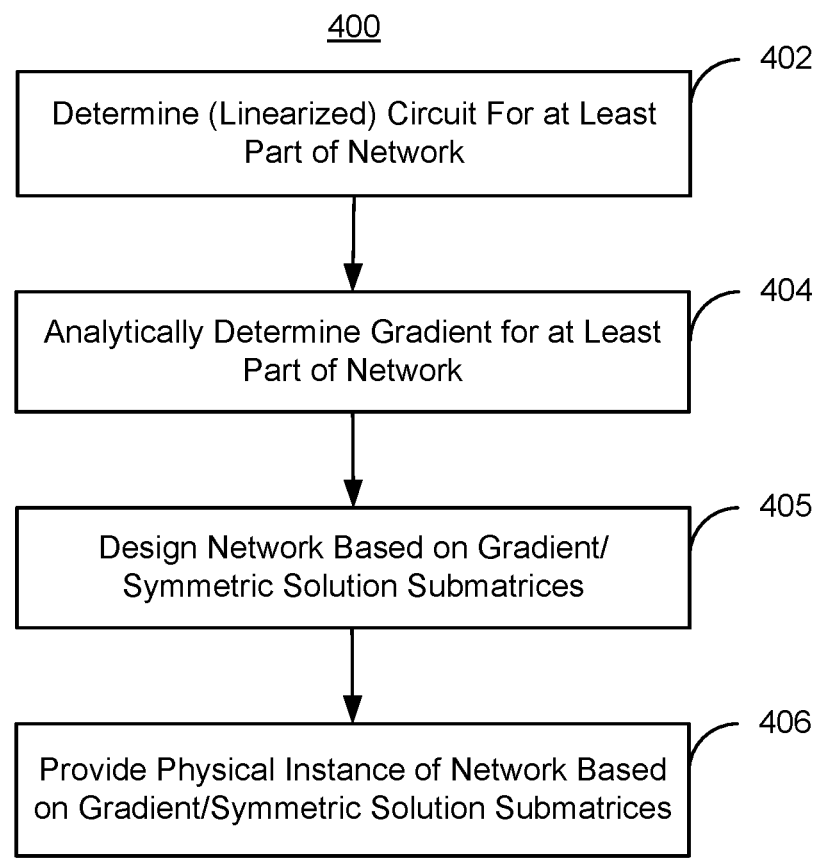
FIG. 4 is a flow chart depicting an embodiment of a method for providing a network having symmetric solution submatrices.

FIG. 4 is a flow chart depicting an embodiment of method 400 for designing a network. Method 400 includes particular processes in a certain order. In some embodiments, some of all of the processes may be performed in another order, including partially or completely in parallel. Further, individual processes may have substeps that are not indicated for simplicity.

A linearized circuit corresponding to at least a portion of a network may be determined, at 402. The portion of the network for which the linearized circuit is provided is symmetric. The linearized circuit may include inputs, outputs, and hidden nodes between the inputs and the outputs. An analytic solution for the linearized circuit is computable via MNA using an MNA solution matrix. The MNA solution matrix for the portion of the network is partially or completely symmetric. In some embodiments, therefore, the MNA solution matrix includes symmetric solution submatrices. Thus, a gradient of the loss function corresponding to the portion of the network is analytically determined using the inverse of the MNA solution matrix and/or symmetric solution submatrices thereof, at 404. Thus, the network may be designed based on the gradient and/or the symmetric solution submatrices, at 405. For example, 405 may include the selection of electrical components layout of a circuit such that the circuit (e.g. a neural network or other circuit) is described by symmetric solution submatrices. A physical instantiation of the network is provided based on the gradient and/or the symmetric solution submatrices, at 406. Stated differently, the network corresponding to the design of 405 may be built at 406. For example, 406 may include the real world connection of selected electrical components in accordance with the design provided at 405. Thus, design of such a network may be facilitated. The network designed at 405 is an idealized network. Because the physical components used may have variations in their characteristics, the physical instantiation of the network built at 406 may have a different gradient than determined at 404. In such cases, the quality of the build, as measured by the difference between the actual gradient the network built and the analytically determined gradient from 404, may be assessed.

For example, suppose layers 120 of learning network 100 are desired to have weights that are programmable using techniques such as equilibrium propagation. At 402 and 404, symmetric solution submatrices for the circuit are determined and the gradients determined. In some embodiments, the solution submatrices are determined at 402 using the linearized circuit and MNA. Other techniques may be used in other embodiments. At 405 the network is configured to be consistent with the gradient and symmetric solution submatrices. For example, neurons analogous to neuron 310 connected via nodes analogous to nodes 202 and/or 204 are configured based on the gradients. Similarly, resistors 302, 304, 306, 322, 324, and 326 are configured to correspond to two sets of weights 110. At 406, learning network 100 including neurons 310 and programmable resistances 302, 304, 306, 322, 324, and 326 is built. In some embodiments, 406 may include adjustments made for real world behavior of the components used. Thus, learning network 100 capable of being programmed using an analytically determined gradient and via equilibrium propagation is provided.

Thus, using method 400 a learning network may be more readily designed and built. The learning network so provided may be described by symmetric solution submatrices. Such a learning network may also be capable of being programmed using equilibrium propagation. Further, the quality of the actual build may be assessed by determining the difference between the gradients determined in 404 and actual performance of the network. Thus, machine learning may be facilitated.

Figure 5:
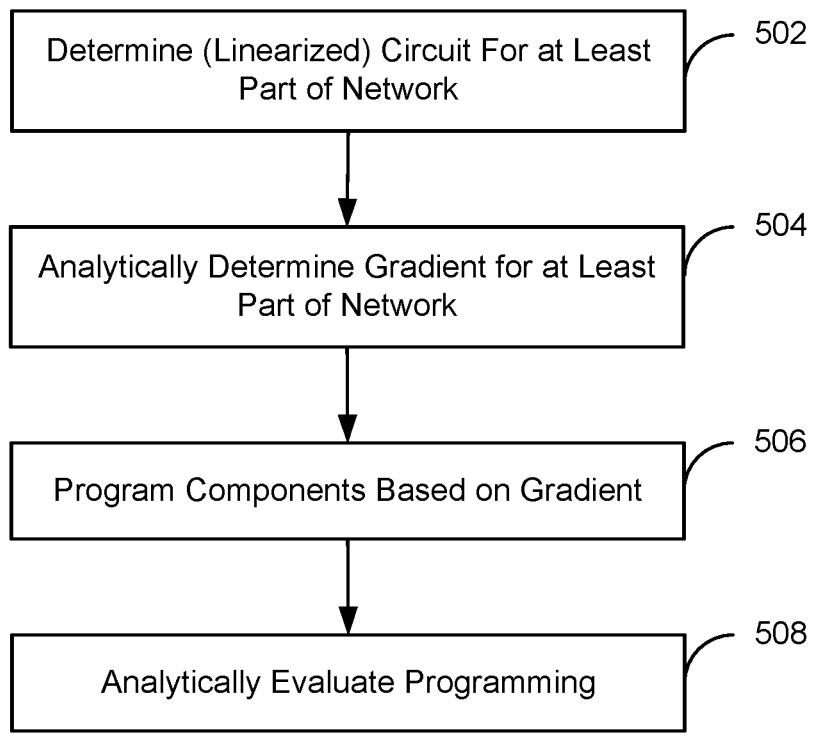
FIG. 5 is a flow chart depicting an embodiment of a method for using a network having symmetric solution submatrices.

FIG. 5 is a flow chart depicting an embodiment of method 500 for programming a network. Thus, method 500 may be used in machine learning. Method 500 includes particular processes in a certain order. In some embodiments, some of all of the processes may be performed in another order, including partially or completely in parallel. Further, individual processes may have substeps that are not indicated for simplicity.

A linearized circuit corresponding to at least a portion of a network is determined, at 502. This portion of the network is symmetric. The linearized circuit includes inputs, outputs, and hidden nodes between the inputs and the outputs. An analytic solution for the linearized circuit is computable via MNA using an MNA solution matrix. The MNA solution matrix for the portion of the network is symmetric. Thus, a gradient of the loss function corresponding to the portion of the network is analytically determined using the inverse of the MNA solution matrix, at 504. At least one component of the at least the portion of the neural network is programmed based on the gradient, at 506. For example, programming the component(s) at 506 may include perturbing the states of the outputs, measuring resulting perturbation(s) of the component(s), and programming the component(s) based on the perturbation(s). Thus, synapses corresponding to hidden nodes may be programmed. Stated differently, the weights (conductances) provided by the components may be adjusted. The programming may be evaluated at 508. For example, the perturbations at hidden nodes determined at 506 may be compared to the expected perturbations using the gradient determined at 504. Programming of a network may be facilitated.

For example, learning network 100 utilizing neuron 310 in layers 120 and programmable resistors 302, 304, 306, 322, 324, and/or 326 are desired to be used for machine learning. At 502 and 504, symmetric solution submatrices and gradients for learning network 100 are determined. Because the solution submatrices for layers 120, weights 110, and neurons 310 (including asymmetric NIC 200 coupled via nodes 202 and 204) are symmetric, the gradient may be determined analytically. At 506 weights 110 (e.g. programmable resistor 302, 304, 306, 322, 324, and 326) are programmed based on the gradient. This programming may be performed via analytic equilibrium propagation. Thus, outputs 104 may be perturbed (as indicated in FIG. 1) and the resulting perturbations at the nodes for weights 110 measured (as indicated in FIG. 1). Because the solution submatrices are symmetric, the effect of changes to weights 110 on output signals at outputs 104 can be determined from this measurement. Weights 110 (e.g. programmable resistors 302, 304, 306, 322, 324, and/or 326) may be updated to bring the output signals closer to the target values based on the measurement. This process may be repeated until programming is complete. At 508, the quality of the programming (e.g. the minimum in the loss function and/or how rapidly the minimum is reached) may be evaluated.

Using method 500, learning networks such as learning network 100 may be programmed using an analytically determined gradient and via equilibrium propagation. Thus, machine learning may be simplified and improved. Further, equilibrium propagation may be evaluated against the gradients calculated. Consequently, machine learning may be improved.

Figure 6:
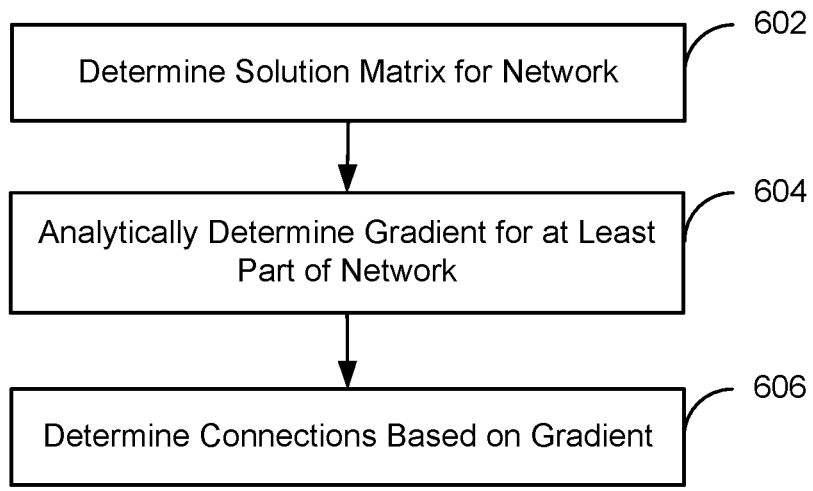
FIG. 6 is a flow chart depicting an embodiment of a method for providing a network having symmetric solution submatrices.

FIG. 6 is a flow chart depicting an embodiment of method 600 for providing a network having symmetric solution submatrices. Method 600 includes particular processes in a certain order. In some embodiments, some of all of the processes may be performed in another order, including partially or completely in parallel. Further, individual processes may have substeps that are not indicated for simplicity.

A solution matrix for a learning network and/or other circuit is determined, at 602. In some embodiments, 602 includes using MNA to provide a MNA solution matrix. In other embodiments, another technique might be used. The solution matrix includes one or more symmetric solution submatrices that correspond to at least a portion of the network. For example, the solution submatrices for the weights and for neurons as connected via nodes in the network may be symmetric.

The gradient of a loss function for the network is determined using the symmetric solution submatrices, at 604. Connections for the portion of the network are determined based on the gradient, at 606. For example, the learning network may include neurons having one or more asymmetric components. The configuration and location of hidden (and other) nodes, their connection to asymmetric components, and/or the asymmetric components used may be determined at 606 such that the submatrices corresponding to the hidden nodes are symmetric. In some embodiments, determining the connections at 606 may also include programming weights for the connections (e.g. in the context of machine learning).

For example, method 600 may be used to provide and/or train learning network 100. The solution matrix for network 100 may be determined, at 602. In some embodiments, MNA is used to determine the solution matrix. The solution matrix includes symmetric solution submatrices. In some embodiments, the entire solution matrix is symmetric. In other embodiments, only portion(s) of the solution matrix are symmetric. Using the solution submatrix, the gradient of the loss function for at least part of the network is determined analytically. In some embodiments, 604 merely includes ensuring that the solution submatrices are symmetric. For example, the symmetry and/or gradients for neuron 310 coupled at nodes 202 and 202 and/or NIC coupled via nodes 102 and 104 may be determined. The connections for network 100 are determined based on the gradient, at 606. In some embodiments, 606 includes coupling the components of layers 120 and weights 110 at hidden and other nodes such that the symmetry of the solution submatrices is achieved. In some embodiments, 606 may also include programming weights 110 via equilibrium propagation to obtain the desired behavior of learning network 100 or other circuit. Thus, using method 600, a learning network or other circuit may be designed, configured, and programmed.

Figure 7:
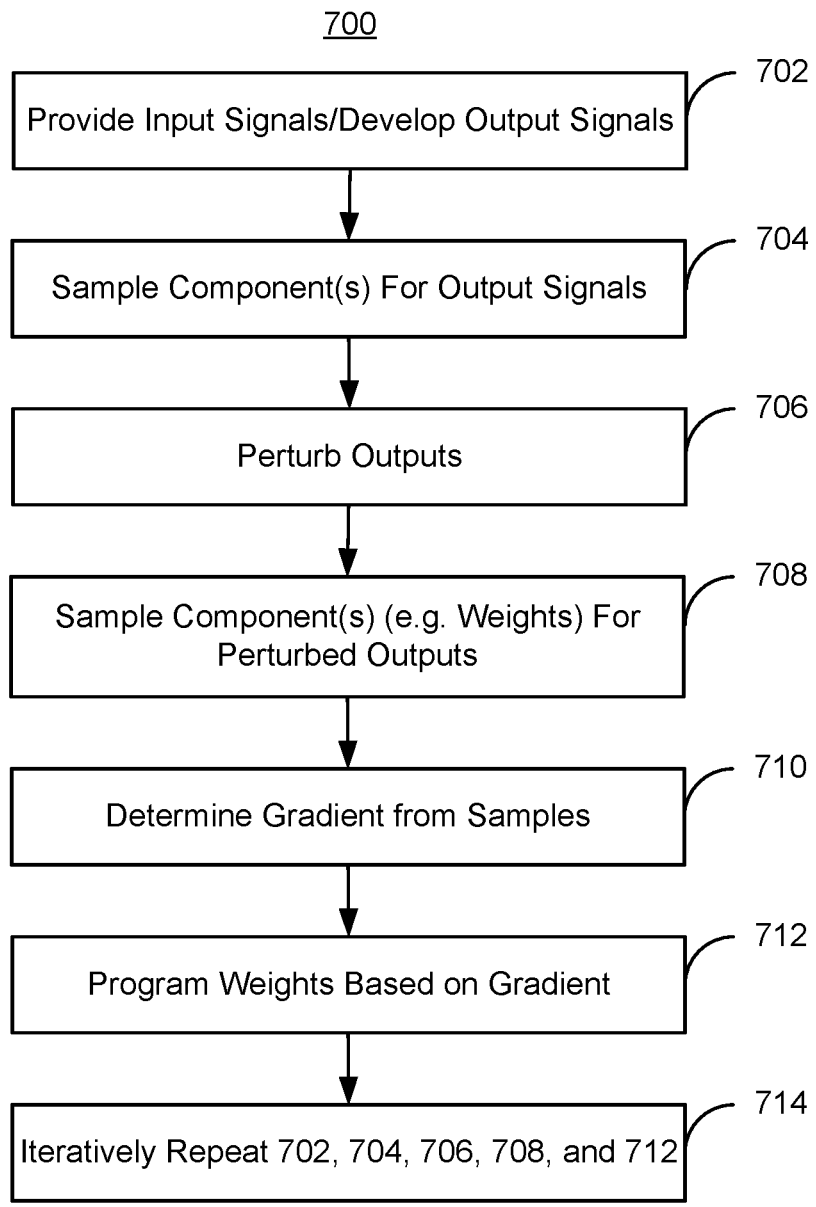
FIG. 7 is a flow chart depicting an embodiment of a method for using a network having symmetric solution submatrices.

FIG. 7 is a flow chart depicting an embodiment of a method for using a network having symmetric solution submatrices. Method 700 includes particular processes in a certain order. In some embodiments, some of all of the processes may be performed in another order, including partially or completely in parallel. Further, individual processes may have substeps that are not indicated for simplicity. Method 700 is used for a learning network that has symmetric solution submatrices. Thus, a perturbation of the outputs and the attendant response at the nodes (hidden or otherwise) is symmetric with respect to a perturbation of the nodes and the corresponding response at the outputs. Consequently, analytic equilibrium propagation may be performed.

Input signals are provided to the inputs of the learning network, at 702. The corresponding output signals are also developed at the outputs as part of 702. Stated differently, an inference may be considered to have been performed. The nodes (e.g. hidden nodes and/or other nodes) for the components are sampled, at 704. Thus, the signals at the nodes and the corresponding output signals are known.

The outputs are perturbed, at 706. For example, the outputs may be clamped at values that are closer to the target values given the input signals. The nodes for the components are sampled again, at 708. Thus, the effect of the perturbation provided at 706 on the nodes is measured at 708. The resulting perturbation from the perturbation of the outputs can be determined. At 710, the gradient is determined from the samples. For example, the values of voltages at (hidden and/or other) nodes measured at 704 (pre-perturbation) is subtracted from the values of voltages at (hidden and/or other) nodes measured at 708. Consequently, the gradient of the loss function with respect to the weights may be determined. The weights are updated based on this gradient. At 712. Stated differently, the weights are updated to bring the output signals closer to the target values based on the measurement. At 714, the process of measuring the unclamped output signals at 702, sampling the components (e.g. the corresponding nodes) at 704, perturbing the outputs at 706, sampling the components for the perturbed outputs and 708, determining the gradient at 710, and programming weights based on the gradient at 712 may be repeated until programming is complete. In some embodiments, the process is repeated until the gradient of the loss function vanishes and/or is below threshold(s).

For example, input signals may be provided via inputs 102 for learning network 100 utilizing neuron 310 in layers 120 and programmable resistors 302, 304, 306, 322, 324, and/or 326, at 702. Also at 702 the output signals (and/or the differences from target values) developed at outputs 104 are measured. Hidden nodes, such as nodes 202 and/or 204 of neurons 310, are sampled at 704. Outputs 104 are perturbed, at 706. The perturbations provided at 706 may be such that the output signals are closer to the desired targets. For example, outputs 104 may be clamped at higher or lower voltages depending upon the target values. Hidden nodes are again sampled, at 708. Thus, the state of the nodes and corresponding components in learning network 100 may be measured for the input signals in the absence of clamping (e.g. at 704) and while perturbed. The gradient of the loss function for the components is calculated based on the measurements, at 710. Weights 110 may be updated based on the gradient, at 712. For example, the resistances of one or more resistors 302, 304, 306, 322, 324, and/or 326 may be changed. At 714 the process is repeated until programming is complete.

Using method 700, learning networks such as learning network 100 may be programmed using an analytically determined gradient and via analytic equilibrium propagation (e.g. via a measured gradient). Thus, machine learning may be simplified and improved. Further, equilibrium propagation may be evaluated against the gradients calculated. Consequently, machine learning may be improved.

Thus, using the techniques described herein, gradients may be analytically determined for symmetric and some asymmetric networks. These gradients may be used to design networks that are at least partially symmetric based on the expected inputs, expected target values, and gradients. Existing networks that are at least partly symmetric may be more readily programmed. Further, because the gradients can be analytically determined, approximations of gradients may be evaluated. Thus, performance may be enhanced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of inputs;
   a plurality of outputs;
   a plurality of hardware neurons;
   a plurality of nodes between the plurality of inputs and the plurality of outputs, the plurality of nodes including a plurality of hidden nodes, a portion of the plurality of hidden nodes being coupled to the plurality of hardware neurons; and
   a plurality of weights including a plurality of programmable impedances coupled between at least a portion of the plurality of nodes, the plurality of weights being coupled to connections, the connections being between the plurality of weights and the portion of the plurality of hidden nodes;
   wherein the connections between the plurality of nodes are configured such that a gradient of a loss function for the system is explicitly computable using symmetric solution submatrices, wherein the symmetric solution submatrices are part of a modified nodal analysis (MNA) solution matrix, the symmetric solution submatrices describing the connections and corresponding to the connections being reciprocal with respect to the plurality of outputs; and
   wherein the plurality of weights are programmable based on the gradient by perturbing a plurality of states of the plurality of outputs, measuring a plurality of resulting perturbations in an electrical characteristic of the connections, and programming the plurality of programmable impedances based on the plurality of resulting perturbations in the electrical characteristic for the connections;
   wherein the measuring the resulting perturbations in the electrical characteristic for the connections corresponds to measuring the gradient for weight of the plurality of weights.

2. The system of claim 1, wherein the gradient is analytically determined using the symmetric solution submatrices.

3. The system of claim 1, wherein a symmetric solution submatrix of the symmetric solution submatrices corresponds to a plurality of network components including at least one of a negative resistance component or a combination of a component and a dual of the component.

4. The system of claim 1, wherein a symmetric solution submatrix of the symmetric solution submatrices corresponds to a network component having at least three terminals.

5. The system of claim 1, further comprising:
   a plurality of electrical components corresponding to at least one asymmetric solution submatrix.

6. The system of claim 1, wherein the plurality of nodes are configured in a plurality of node layers, the plurality of weights are configured in a plurality of weight layers, the plurality of weight layers being interleaved with the plurality of node layers, the connections being between the plurality of weight layers and the plurality of node layers.

7. A network, comprising:
   plurality of inputs;
   a plurality of outputs;
   a plurality of hardware neurons;
   a plurality of nodes between the plurality of inputs and the plurality of outputs, the plurality of nodes including a plurality of hidden nodes, a portion of the plurality of hidden nodes being coupled with the plurality of hardware neurons, a portion of the network having an analytic solution computable by modified nodal analysis (MNA) using an MNA solution matrix, at least one submatrix of the MNA solution matrix being at least one symmetric solution submatrix, connections between the plurality of hidden nodes being configured such that a gradient of a loss function for the network explicitly is calculatable using the at least one symmetric solution submatrix, the at least one symmetric solution submatrix describing the connections and corresponding to the connections being reciprocal with respect to the plurality of outputs; and
   a plurality of weights for the plurality of hidden nodes, the plurality of weights being coupled with the connections, the plurality of weights including a plurality of programmable impedances coupled between at least a portion of the plurality of nodes, the plurality of programmable impedances being programmable based on the gradient of the loss function by perturbing a plurality of states of the plurality of outputs, measuring a plurality of resulting perturbations in at least one electrical characteristic for the connections, and programming the plurality of programmable impedances based on the plurality of resulting perturbations in the at least one electrical characteristic, the connections being between the portion of the plurality of hidden nodes and the plurality of weights;

wherein the measuring the resulting perturbations for the connections corresponds to measuring the gradient for the plurality of weights.

8. The network of claim 7, further comprising:
an additional portion including a plurality of electrical components, the additional portion of the network corresponding to at least one asymmetric solution matrix.

9. The network of claim 7, wherein the at least one symmetric solution submatrix corresponds to a plurality of network components including at least one of a negative resistance component or a combination of a component and a dual of the component.

10. The network of claim 7, wherein a symmetric solution submatrix of the at least one symmetric solution submatrix corresponds to a network component having at least three terminals.

11. The network of claim 7, wherein the plurality of nodes are configured in a plurality of node layers, the plurality of weights are configured in a plurality of weight layers, the plurality of weight layers being interleaved with the plurality of node layers, the connections being between the plurality of weight layers and the plurality of node layers.

12. A method, comprising:
determining a solution matrix for a network using modified nodal analysis (MNA), the network including a plurality of inputs, a plurality of outputs, a plurality of nodes including a plurality of hidden nodes, a plurality of hardware neurons, and a plurality of weights including a plurality of programmable impedances coupled between the plurality of nodes, a portion of the plurality of hidden nodes being coupled with the plurality of hardware neurons, at least one symmetric solution submatrix of the solution matrix corresponding to at least a portion of the network;
explicitly determining a gradient of a loss function for the at least the portion of the network using the at least one symmetric solution submatrix; and
determining a plurality of connections for the portion of the network based on the gradient, the at least one symmetric solution submatrix describing the plurality of connections and corresponding to the connections being reciprocal with respect to the plurality of outputs, the plurality of connections being coupled to the plurality of weights and being between the plurality of weights and the portion of the plurality of hidden nodes, wherein the determining the plurality of connections further includes programming the plurality of weights for the plurality of connections based on the gradient by
perturbing a plurality of states of the plurality of outputs;
measuring a plurality of resulting perturbations in an electrical characteristic of the connections, the measuring the plurality of resulting perturbations in the electrical characteristic of the connections corresponding to measuring the gradient for the plurality of weights; and
programming the plurality of programmable impedances based on the plurality of resulting perturbations.

13. The method of claim 12, wherein a remaining portion of the network corresponds to at least one component having at least one asymmetric solution submatrix.

14. The method of claim 12, wherein the determining the plurality of connections further includes:
designing at least a portion of the network based on the gradient.

15. The method of claim 14, wherein the determining the plurality of connections further includes:
providing a physical instantiation of the network based on the gradient.

16. The method of claim 15, wherein the providing the physical instantiation further includes:
providing the at least the portion of the network corresponding to the at least one symmetric solution submatrix, the at least the portion of the network including a plurality of network components including at least one of a negative resistance component or a combination of a component and a dual of the component.

17. The method of claim 15, wherein the providing the physical instantiation further includes:
providing at least one device having at least three terminals.

18. The method of claim 12, wherein the plurality of nodes are configured in a plurality of node layers, the plurality of weights are configured in a plurality of weight layers, the plurality of weight layers being interleaved with the plurality of node layers, the connections being between the plurality of weight layers and the plurality of node layers.

* * * * *